US007361087B2

(12) United States Patent
Baerlocher et al.

(10) Patent No.: US 7,361,087 B2
(45) Date of Patent: Apr. 22, 2008

(54) GAMING DEVICE HAVING HIGH-LOW GAME

(75) Inventors: Anthony J. Baerlocher, Reno, NV (US); Cari L. Blomquist, Reno, NV (US); Peter Gerrard, Manchester (GB); Joseph E. Kaminkow, Reno, NV (US)

(73) Assignee: IGT, Reno, NV (US)

( * ) Notice: Subject to any disclaimer, the term of this patent is extended or adjusted under 35 U.S.C. 154(b) by 633 days.

(21) Appl. No.: 10/888,111

(22) Filed: Jul. 9, 2004

(65) Prior Publication Data

US 2005/0014549 A1 Jan. 20, 2005

Related U.S. Application Data

(60) Provisional application No. 60/488,676, filed on Jul. 18, 2003.

(51) Int. Cl.
*A63F 13/00* (2006.01)

(52) U.S. Cl. ............................ 463/17; 463/16; 463/25

(58) Field of Classification Search ............. 273/138.1, 273/146, 292; 463/1, 7–22, 31
See application file for complete search history.

(56) References Cited

U.S. PATENT DOCUMENTS

| | | | |
|---|---|---|---|
| 3,825,255 | A | 7/1974 | Kennard et al. |
| 4,448,419 | A | 5/1984 | Telnaes |
| 4,624,459 | A | 11/1986 | Kaufman |
| 4,836,546 | A | 6/1989 | Di Re et al. |
| 5,072,946 | A | 12/1991 | Miller |
| 5,154,420 | A | 10/1992 | Gutknecht |
| 5,324,041 | A | 6/1994 | Boylan et al. |
| 5,524,888 | A | 6/1996 | Heidel |

(Continued)

FOREIGN PATENT DOCUMENTS

| | | |
|---|---|---|
| DE | WO 00/12186 | 3/2000 |

(Continued)

OTHER PUBLICATIONS

Beer Game: High-low description, printed from reelbeer.com (website) on May 3, 2001.

(Continued)

*Primary Examiner*—John M. Hotaling, II
*Assistant Examiner*—Steven J. Hylinski
(74) *Attorney, Agent, or Firm*—Bell, Boyd & Lloyd LLP

(57) ABSTRACT

A gaming device that randomly generates and displays a set of different amounts on a display device. In one embodiment, the game generates three amounts. The game asks the player to pick one of the amounts for which the player thinks that the game will generate a comparison amount having a higher value. That is, the game asks the player to pick an amount that will be less than the generated comparison amount. Or, the game can ask the player to pick an amount that will be higher than the generated comparison amount. Alternatively, the game can ask the player to pick, for one of the displayed amounts, whether a generated comparison amount will be higher or lower than the displayed amount. In any of these three embodiments, if the player is correct, the game provides an award to the player.

17 Claims, 9 Drawing Sheets

U.S. PATENT DOCUMENTS

| | | | |
|---|---|---|---|
| 5,647,798 A | 7/1997 | Falciglia | |
| 5,664,999 A | 9/1997 | Kurihara | |
| 5,855,514 A | 1/1999 | Kamille | |
| 5,928,081 A | 7/1999 | Bochichio et al. | |
| 5,954,336 A | 9/1999 | Goossens et al. | |
| 5,988,643 A | 11/1999 | Awada | |
| 6,015,346 A | 1/2000 | Bennett | |
| 6,033,307 A | 3/2000 | Vancura | |
| 6,089,976 A | 7/2000 | Schneider et al. | |
| 6,102,798 A | 8/2000 | Bennett | |
| 6,135,882 A | 10/2000 | Kadlic | |
| 6,142,874 A | 11/2000 | Kodachi et al. | |
| 6,142,875 A | 11/2000 | Kodachi et al. | |
| 6,146,271 A | 11/2000 | Kadlic | |
| 6,159,095 A | 12/2000 | Frohm et al. | |
| 6,159,096 A | 12/2000 | Yoseloff | |
| 6,159,097 A | 12/2000 | Gura | |
| 6,159,098 A | 12/2000 | Slomiany et al. | |
| 6,168,523 B1 | 1/2001 | Piechowiak et al. | |
| 6,174,235 B1 | 1/2001 | Walker et al. | |
| 6,179,711 B1 | 1/2001 | Yoseloff | |
| 6,190,255 B1 | 2/2001 | Thomas et al. | |
| 6,224,483 B1 | 5/2001 | Mayeroff | |
| 6,231,442 B1 | 5/2001 | Mayeroff | |
| 6,296,568 B1 | 10/2001 | Tracy | |
| 6,305,686 B1 | 10/2001 | Perrie et al. | |
| 6,309,300 B1 | 10/2001 | Glavich | |
| 6,312,334 B1 | 11/2001 | Yoseloff | |
| 6,315,660 B1 | 11/2001 | DeMar et al. | |
| 6,315,664 B1 | 11/2001 | Baerlocher et al. | |
| 6,322,309 B1 | 11/2001 | Thomas et al. | |
| 6,398,220 B1 | 6/2002 | Inoue | |
| 6,506,118 B1 | 1/2003 | Baerlocher et al. | |
| 6,514,141 B1 | 2/2003 | Kaminkow et al. | |
| 6,565,084 B1 | 5/2003 | Katz et al. | |
| 6,575,828 B1 * | 6/2003 | NewDelman | 463/16 |
| 6,602,135 B1 | 8/2003 | Gerrard | |
| 6,648,756 B2 * | 11/2003 | Moody | 463/18 |
| 6,746,328 B2 | 6/2004 | Cannon et al. | |
| 6,761,353 B2 | 7/2004 | Berman et al. | |
| 6,780,107 B2 | 8/2004 | Baerlocher et al. | |
| 6,808,174 B1 | 10/2004 | Rubin | |
| 7,048,274 B2 | 5/2006 | Duncombe et al. | |
| 2001/0015529 A1 * | 8/2001 | Allen | 273/292 |
| 2002/0135129 A1 | 9/2002 | Tarantino | |
| 2002/0187827 A1 | 12/2002 | Blankstein | |
| 2003/0104852 A1 | 6/2003 | Duhamel | |
| 2003/0153378 A1 | 8/2003 | Schlegel et al. | |
| 2005/0032565 A1 | 2/2005 | Cheng et al. | |
| 2005/0059448 A1 | 3/2005 | Sims et al. | |

FOREIGN PATENT DOCUMENTS

| | | |
|---|---|---|
| EP | 0 281 402 | 9/1988 |
| EP | 0 945 837 | 9/1999 |
| GB | 2105891 | 3/1983 |
| GB | 2214389 A | 8/1989 |
| GB | 2 222 712 | 3/1990 |
| GB | 2 262 642 A | 6/1993 |
| GB | 2305531 A | 4/1997 |
| WO | WO 82/01611 | 5/1982 |
| WO | WO 85/03158 | 7/1985 |
| WO | WO 98/00207 | 1/1998 |
| WO | WO 02/066127 | 8/2002 |

OTHER PUBLICATIONS

Double Up Poker Game Description written by IGT, available prior to 2000.

High-low card game description, printed from math.hws.edu (website) on Aug. 2, 2004.

High-low card game description, printed from www.geocities.com (website) on Aug. 2, 2004.

In Between Game Description IGT, available prior to 2000.

Price is Right Dice Game Article, printed from gscentral.net/dice.htm website on Jul. 30, 2004.

Price is Right Hi-Lo Article, printed from gscentral.net/hilo.htm website on Jul. 30, 2004.

Roulette Description, Gaming Guide Peppermill Hotel, available prior to 2000.

Run for Your Money Brochure, IGT, 1998.

* cited by examiner

GAMING DEVICE HAVING HIGH-LOW GAME

PRIORITY CLAIM

This application is a non-provisional application of, claims priority to and the benefit of U.S. Provisional Patent Application Ser. No. 60/488,676 filed on Jul. 18, 2003, the entire contents of which are incorporated herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates in general to a gaming device, and more particularly to a gaming device having a high-low game.

Gaming devices provide enjoyment and excitement to players, in part, because they may ultimately lead to a monetary award for the player. Gaming devices also provide enjoyment and excitement to players because they are fun to play. Bonus or secondary games, in particular, provide gaming device manufacturers with an opportunity to add enjoyment and excitement to that which is already expected from a primary or base wagering game of the gaming device. Bonus games provide extra awards to the player and enable the player to play a game that is different than the base game.

A continuing need exists to provide gaming devices that issue awards in an exciting and enjoyable manner. In this respect, it is desirable to enable the player to have an impact on, or a hand in, determining the player's ultimate award. It is also desirable to enable a player to optimize an award. It is further desirable to increase the level of player interaction. Each of these features can be desirable in a base or primary game and in a bonus or secondary game.

One popular game requiring players to think and decide before making a selection, the success of which is decided by a random selection, is the game of High-Low. High-Low is normally played with a conventional deck of cards. Different forms of this game exist, but they each include a common component; namely, the player is shown at least one card and must guess whether the next card is higher.

In one known High-Low Card game, the player is dealt a card. The player guesses whether the next card will be higher or lower than the dealt card. If the player is wrong, the player pays a penalty. If the player is right, the player keeps the card and guesses again. If the player guesses right three times in a row, the player may hand off the three accumulated cards to the next player. When a player guesses wrong, the player pays a penalty for each accumulated card. In one embodiment, the game ends and the player loses all money wagered in the game and all money won in the game previously.

Other High-Low Card games require the player to guess right five times in a row to win. When played merely for excitement and enjoyment, if the same card is generated after the player's guess, the player loses because the card is not higher or lower. In other variations, however, the same card yields a draw.

In gaming establishments, a High-Low Card game concept is employed in manual or video poker "double-ups." In "double-up" poker gaming, a player can risk a currently achieved award to double the player's award. In such games, the dealer deals the player and the dealer a card. If the player's card beats the dealer's card, the player obtains double the award. If the dealer's card wins, the player gets nothing. In another game, the dealer deals a plurality of displayed cards and the player picks one of the cards the player believes will be less than or greater than the next card dealt. In poker double-ups, a tie typically results in a draw, whereby the player can double-up again or keep the previously accumulated win.

High-Low Card games are fun, exciting, simple, interactive and involve mathematical thought. Accordingly, new and different high-low games can make an entertaining primary or bonus game for a wagering gaming device.

SUMMARY OF THE INVENTION

The present invention provides a gaming device having a High-Low game that may be implemented in a primary or secondary game of wagering gaming device. More specifically, the present invention provides a processor controlled gaming device that randomly generates and displays a set of amounts on a display device. In one embodiment, the game generates three amounts. The game asks the player to pick one of the amounts for which the player thinks that the game will generate a comparison amount having a higher value. That is, the game asks the player to pick an amount that will be less than the generated comparison amount. Or, the game can ask the player to pick an amount that will be higher than the generated comparison amount. Alternatively, the game can ask the player to pick, for one of the displayed amounts, whether a generated comparison amount will be higher or lower than the displayed amount. In any of these three embodiments, if the player is correct, the game may provide an award or increment an award meter.

If the player is not correct, the game provides one of three responses in one embodiment. First, the game ends and provides the player with the most recently incremented award displayed on the award meter. Second, the game provides the player a strike or other partial termination result, which may or may not be the last strike. When the player achieves the last strike, the game ends and the player receives the award displayed on the award meter. Third, the game removes the amount that the player has selected from the set of amounts. When the game has removed a predefined number of amounts, the game ends and the player receives an award.

In each of these embodiments, the award meter has a limit so that if the player increments the award to its limit through successful play, the game ends. The game may, in addition to or instead of the award limit, maintain a predefined number of tries, so that the game ends after the number of tries.

As the player plays the game until termination, the game may provide one of the select higher, select lower or select higher or lower comparison types, described above, for each of the player's selections. The player may begin the game with any of the comparison types and alternate between one or both of the other types. The game may switch types after every three, four, five, or other designated number of selections. The game may randomly choose from two or three of the comparison types, wherein one or more of the types is adapted to be generated more often than one or more other types.

The game in one embodiment generates a comparison amount for each displayed amount even though the player only picks one displayed amount per try. This is because the game provides and displays a fresh set of displayed amounts for each try. The game in one alternative embodiment replaces the displayed amounts of a new try with the comparison amounts generated in the previous try. That is, if in one try the game displays the comparison amounts of 4, 3 and 6 in a first try, the game displays the amounts of 4, 3 and 6 in the second try. In this manner, the player selects from a different set of amounts in each try or section of the game.

In alternative embodiments, the game does not provide a preset award or increment an award meter by a preset amount. Instead, either the set of amounts or the set of comparison amounts forms the player's award. Thus, if on the player's last try, the game generates the comparison numbers 4, 3 and 6, the player's award is in one embodiment 436. In another alternative embodiment, the player attempts to upgrade the award, which is the set of amounts, by trying to pick a higher number for one of the digits. The player, for example may pick the 3 in 436 and upgrade the award to 486. In this embodiment, the player must live with a lower number if it is generated.

In these alternative embodiments, the game may be adapted to eliminate a digit if the player incorrectly guesses if a generated comparison number is higher or lower. The player here must weigh the risk of losing a digit against the potential gain and likelihood of success of upgrading one of the digits. In any of these embodiments, the game may also be adapted to provide a "keep" button or input, so that the player can stop and keep an award or continue to attempt to upgrade the award. In other embodiments, the player must make a predefined or randomly determined number of selections, or the player must play until a predefined or randomly determined number of digits of the award are eliminated.

It is therefore an advantage of the present invention to provide a new base or bonus game for a wagering gaming device.

Another advantage of the present invention is to provide a number of different types of High-Low games for a wagering gaming device.

A further an advantage of the wagering gaming device of the present invention is to integrate an incrementing award meter with one or more of the High-Low games.

A further advantage of the wagering gaming device of the present invention is to combine High-Low selections with an offer and acceptance game.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
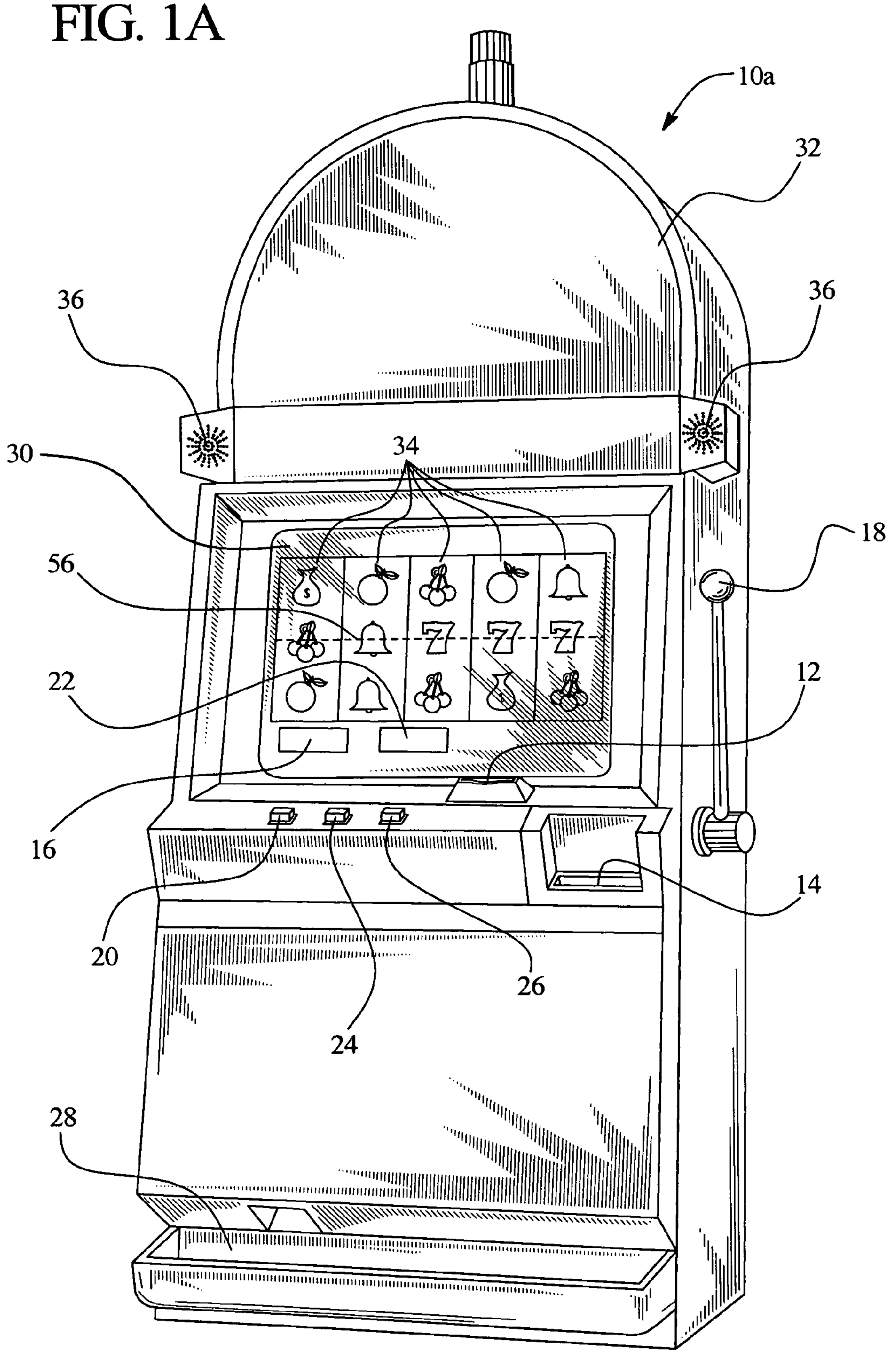
FIGS. 1A and 1B are perspective views of alternative embodiments of the gaming device of the present invention.
Figure 1B:
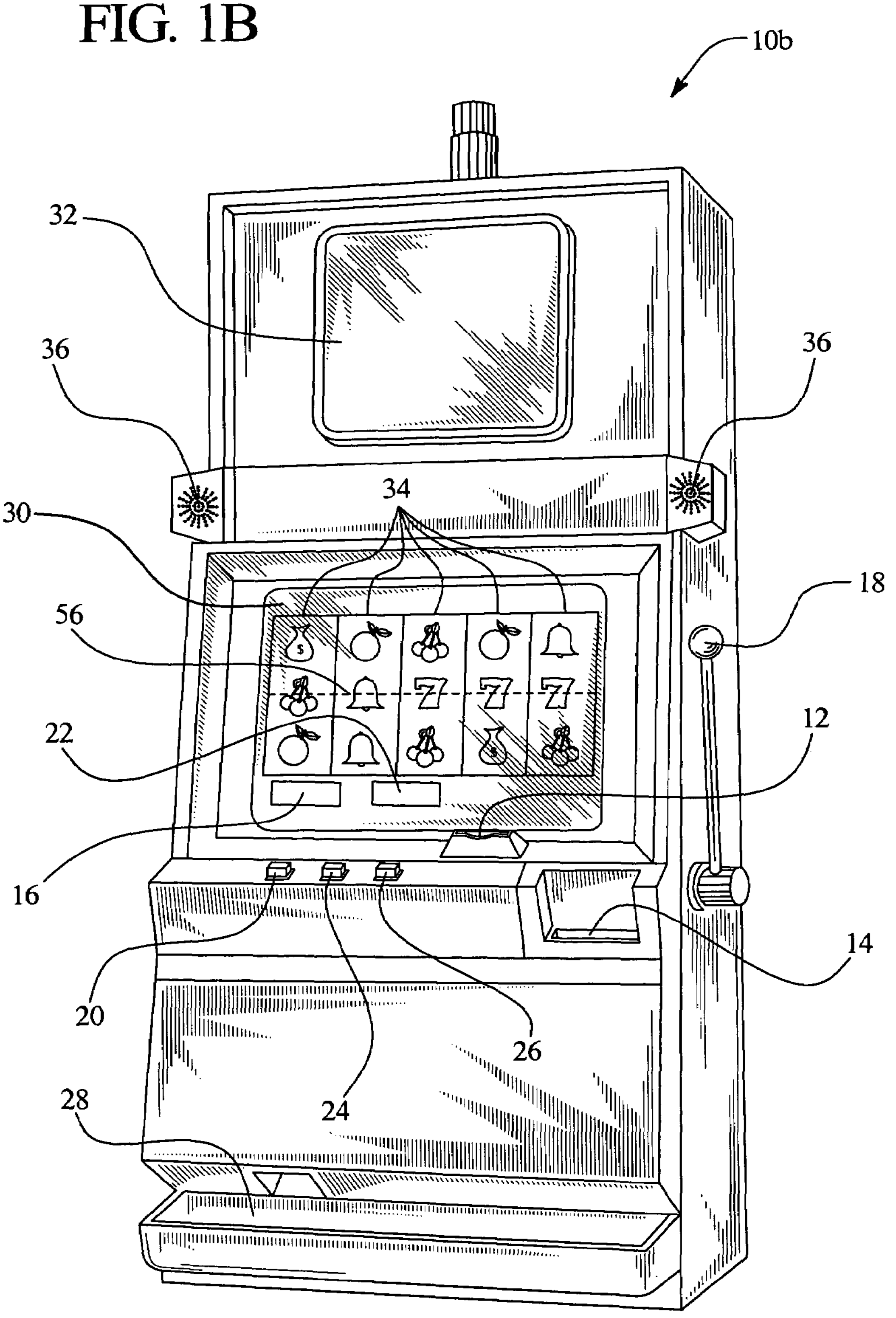

Referring now to the drawings, and in particular to FIGS. 1A and 1B, gaming device 10*a* and gaming device 10*b* illustrate two possible cabinet styles and display arrangements and are collectively referred to herein as gaming device 10. The present invention includes the game (described below) being a stand alone base or primary game or a bonus or secondary game that coordinates with a base or primary game. When the game of the present invention is a bonus game, gaming device 10 in one base game is a slot machine having the controls, displays and features of a conventional slot machine, wherein the player operates the gaming device while standing or sitting. Gaming device 10 also includes being a pub-style or table-top game (not shown), which a player operates while sitting.

The base games of the gaming device 10 may include slot, poker, blackjack or keno, among others. The gaming device 10 also embodies any suitable bonus triggering events, bonus games as well as any suitable progressive game coordinating with these base games. The symbols and indicia used for any of the base, bonus and progressive games include mechanical, electrical or video symbols and indicia.

In a stand alone base or a bonus embodiment, the gaming device 10 includes monetary input devices. FIGS. 1A and 1B illustrate a coin slot 12 for coins or tokens and/or a payment acceptor 14 for cash money. The payment acceptor 14 also includes other devices for accepting payment, such as readers or validators for credit cards, debit cards or smart cards, tickets, notes, etc. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. A player may cash out by pushing a cash out button 26 to receive coins or tokens in the coin payout tray 28 or other forms of payment, such as an amount printed on a ticket or credited to a credit card, debit card or smart card. Well known ticket printing and card reading machines (not illustrated) are commercially available.

Gaming device 10 also includes one or more display devices. The embodiment shown in FIG. 1A includes a central display device 30, and the alternative embodiment shown in FIG. 1B includes a central display device 30 as well as an upper display device 32. The display devices display any visual representation or exhibition, including but not limited to movement of physical objects such as mechanical reels and wheels, dynamic lighting and video images. The display device includes any viewing surface such as glass, a video monitor or screen, a liquid crystal display or any other static or dynamic display mechanism. In a video poker, blackjack or other card gaming machine embodiment, the display device includes displaying one or more cards. In a keno embodiment, the display device includes displaying numbers.

The slot machine base game of gaming device 10 displays a plurality of reels 34 such as three to five reels 34, in mechanical or video form on one or more of the display devices. Each reel 34 displays a plurality of indicia such as bells, hearts, fruits, numbers, letters, bars or other images which preferably correspond to a theme associated with the gaming device 10. If the reels 34 are in video form, the display device displaying the video reels 34 is preferably a video monitor. Each base game, especially in the slot machine base game of the gaming device 10, includes speakers 36 for making sounds or playing music.

Figure 2:
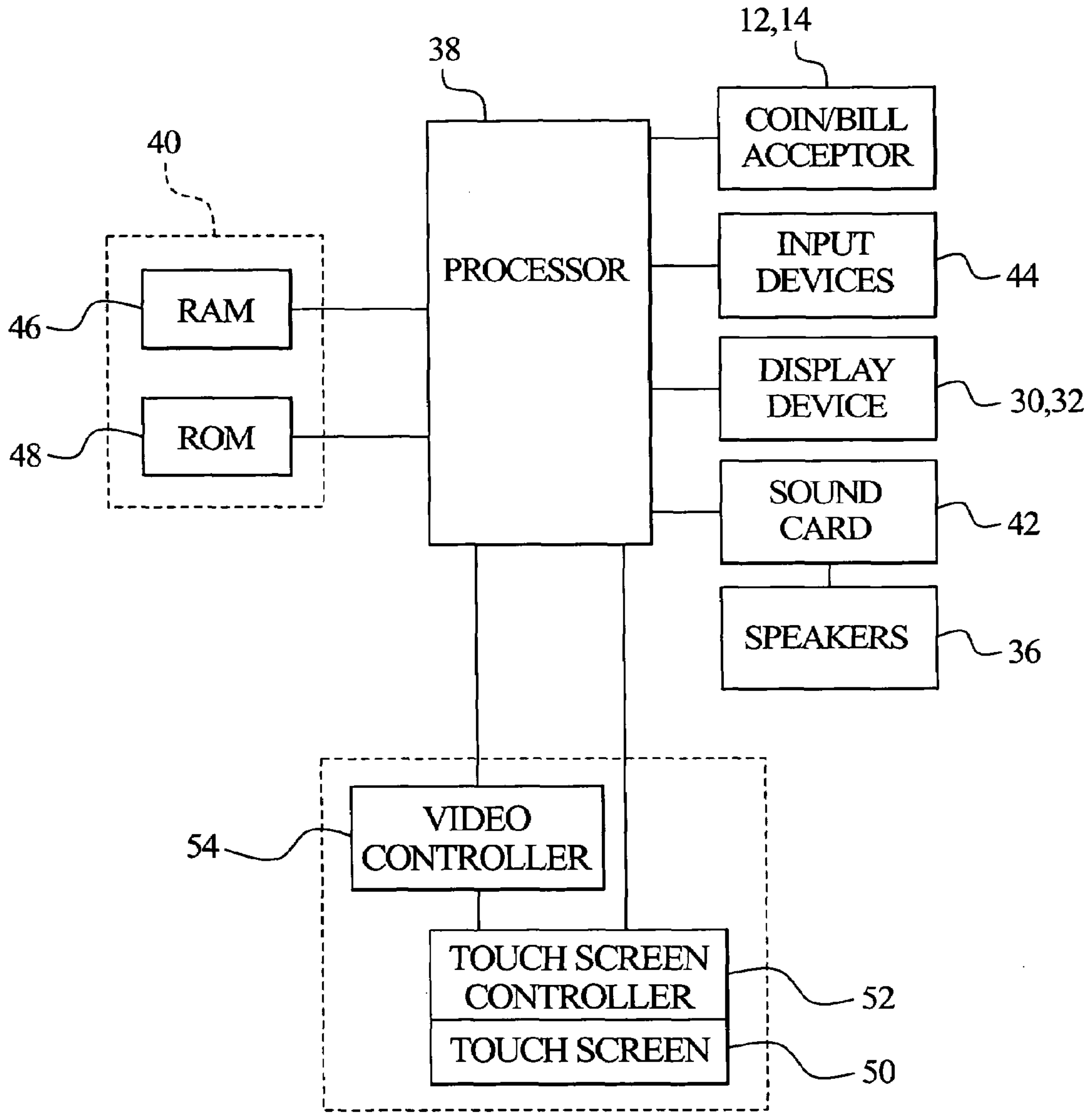
FIG. 2 is a schematic block diagram of the electronic configuration of one embodiment of the gaming device of the present invention.

Referring now to FIG. 2, a general electronic configuration of the gaming device 10 for the stand alone and bonus embodiments described above preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 includes random access memory (RAM) 46 for storing event data or other data generated or used during a particular game. The memory device 40 also includes read only memory (ROM) 48 for storing program code, which controls the gaming device 10 so that it plays a particular game in accordance with applicable game rules and pay tables.

As illustrated in FIG. 2, the player preferably uses the input devices 44 to input signals into gaming device 10. In the slot machine base game, the input devices 44 include the pull arm 18, play button 20, the bet one button 24 and the cash out button 26. A touch screen 50 and touch screen controller 52 are connected to a video controller 54 and processor 38. The terms "computer" or "controller" are used herein to refer collectively to the processor 38, the memory device 40, the sound card 42, the touch screen controller and the video controller 54.

In certain instances, it is preferable to use a touch screen 50 and an associated touch screen controller 52 instead of a conventional video monitor display device. The touch screen enables a player to input decisions into the gaming device 10 by sending a discrete signal based on the area of the touch screen 50 that the player touches or presses. As further illustrated in FIG. 2, the processor 38 connects to the coin slot 12 or payment acceptor 14, whereby the processor 38 requires a player to deposit a certain amount of money in to start the game.

It should be appreciated that although a processor 38 and memory device 40 are preferable implementations of the present invention, the present invention also includes being implemented via one or more application-specific integrated circuits (ASIC's), one or more hard-wired devices, or one or more mechanical devices (collectively or alternatively referred to herein as a "processor"). Furthermore, although the processor 38 and memory device 40 preferably reside in each gaming device 10 unit, the present invention includes providing some or all of their functions at a central location such as a network server for communication to a playing station such as over a local area network (LAN), wide area network (WAN), Internet connection, microwave link, and the like.

With reference to the slot machine base game of FIGS. 1A and 1B, to operate the gaming device 10, the player inserts the appropriate amount of tokens or money in the coin slot 12 or the payment acceptor 14 and then pulls the arm 18 or pushes the play button 20. The reels 34 then begin to spin. Eventually, the reels 34 come to a stop. As long as the player has credits remaining, the player can spin the reels 34 again. Depending upon where the reels 34 stop, the player may or may not win additional credits.

In addition to winning base game credits, the gaming device 10, including any of the base games disclosed above, also includes bonus games that give players the opportunity to win credits. The gaming device 10 preferably employs a video-based display device 30 or 32 for the bonus games. The bonus games include a program that automatically begins when the player achieves a qualifying condition in the base game.

In the slot machine embodiment, the qualifying condition includes a particular symbol or symbol combination generated on a display device. As illustrated in the five reel slot game shown in FIGS. 1A and 1B, the qualifying condition includes the number seven appearing on, e.g., three adjacent reels 34 along a payline 56. It should be appreciated that the present invention includes one or more paylines, such as payline 56, wherein the paylines can be horizontal, diagonal or any combination thereof. An alternative scatter pay qualifying condition includes the number seven appearing on, e.g., three adjacent reels 34 but not necessarily along a payline 56, appearing on any different set of reels 34 three times or appearing anywhere on the display device the necessary number of times.

Award Meter Game

Figure 3A:
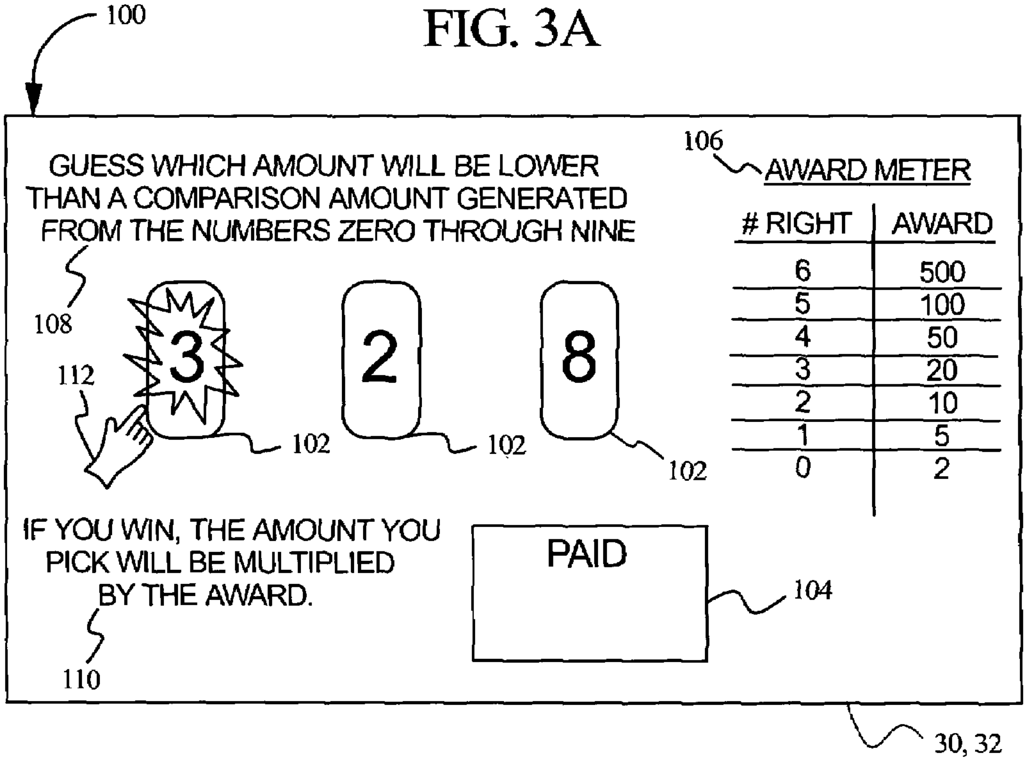
FIGS. 3A and 3B illustrate various embodiments of the present invention, wherein the game generates a single amount with which to compare to a set of player selectable displayed amounts.

Referring now to FIG. 3A, one of the display devices 30 or 32 displays a screen 100 having one embodiment of a High-Low game of the present invention. The screen 100 displays a set of amounts 102, which are randomly generated by a random number generator stored in the memory device 40 and operable by the processor. The set may include any suitable number of amounts 102. In one embodiment, as illustrated herein, the set includes three amounts 102.

The amounts 102 are preferably Arabic numerals such as 3, 2 and 8 as illustrated, and in one embodiment are generated from a non-weighted database of the numerals zero through nine. In other embodiments, the game may be adapted such that the amounts 102 are Roman numerals, face cards, or face card symbols, or other symbols. In other embodiments, one or more amounts 102 may be weighted such that they are selected more often than at least one other amount. For instance, a 1 amount may be weighted to be selected more times than a 9 amount.

The screen 100 also includes a paid display 104, which indicates the player's award when the player wins or finishes at the High-Low game of the present invention. The screen 100 and the other screens illustrated herein may include other indicators, such as a simulated credit display 16 (FIGS.

1A and 1B), a bet lines display, a bet per line display and total bet display, or others which are not illustrated here for convenience. The screen 100 and the other screens may also contain indicia and symbols relating to a theme of the present invention.

In one embodiment, the game increments an award meter 106 when the player successfully plays the High-Low game of the present invention. The award meter 106 is stored in the memory device 40, and the screen 100 displays the award meter 106 in the embodiment.

The award meter 106 may be adapted differently depending upon whether the game is implemented as a primary or secondary game. In a primary game, if the player does not successfully play the game at least once, the game does not pay anything to the player. Accordingly, the meter 106 does not display an award for no successful or correct plays. In a bonus game, the game preferably pays the player a consolation award if the player has no successful plays. The screen 100 illustrates a bonus game embodiment, wherein the award meter 106 indicates that the player receives an award of 2 for no successful plays.

The remainder of the award meter 106 of the screen 100 shows an award distribution that in one embodiment grows non-linearly as the number of consecutive successful plays increase. The award meter may be adapted to have any suitable distribution desired by the implementor. The award meter 106 applies to embodiments requiring successful plays in a row or to embodiments enabling the player to accumulate successful plays until a predefined condition occurs.

The awards can represent any suitable type of gaming device 10 value, such as a number of game credits, a game credit multiplier, a number of selections from a prize pool or a number of free games. If the award is a credit multiplier, the multiplier value in the paid display 104 preferably multiplies a number of game credits displayed elsewhere on the gaming device 10, such as the player's total bet, total credits indicated by the credit display 16 (FIGS. 1A and 1B), bet per one or more active slot paylines or wins along one or more slot paylines.

The screen 100 provides an audio, visual or audiovisual message 108 that sets forth the game procedure for this embodiment. The message 108 indicates that the game will generate a comparison amount from the numerals zero through nine (the same range as for the amounts 102) and that the player should pick the amount that the player feels will be lower than the comparison amount. In this embodiment, since the game only generates one comparison amount, the player's best odds to win occurs by picking the lowest amount 102 of two. However, this embodiment entices the player to pick an amount other than the lowest amount by indicating in the message that the pick is a multiplier award.

Figure 3B:
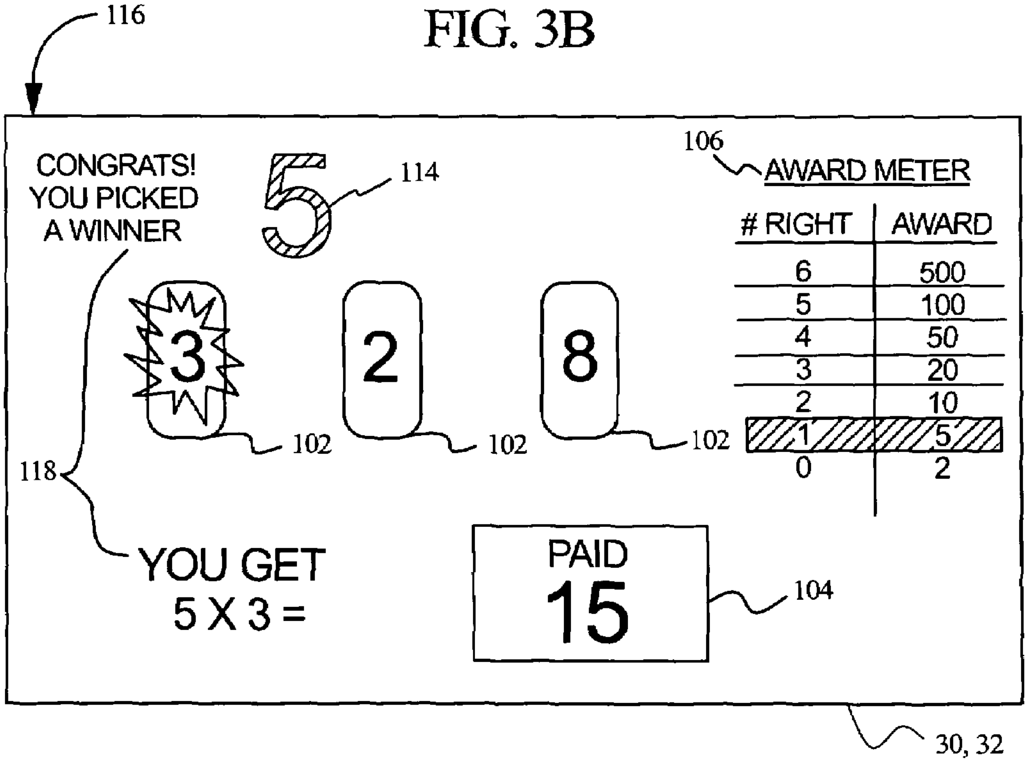

In the screen 100, the player 112 picks the amount 102 of three, whereby the game generates the comparison amount 114 of five, as illustrated in the screen 116 of FIG. 3B. A message 118 indicates that the player correctly picked a winner. The player's award for winning one time is five as indicated by the award meter 106. In one embodiment, the game multiples the five award by the selected three amount 102 and pays the player fifteen credits as indicated by the paid display 104. The game, in one embodiment, continues by generating a fresh set of amounts 102 and repeating the above sequence.

In one embodiment, each player selectable input including the amount 102 inputs and any other inputs associated with the High-Low game are preferably areas of a touch screen 50 (FIG. 2) in communication with the processor 38 and a touch screen controller 52. In another embodiment, one or more or all of these inputs may be separate electromechanical input devices, mounted elsewhere on the gaming device 10, which are in communication with the processor 38.

In the touch screen embodiment, the player picks the desired amount 102 or a visually defined simulated area around the desired amount, as it appears through the touch screen 50 of the display device 30 or 32. Otherwise, the display device 30 or 32 may be adapted to have a separate simulated or electromechanical input (not illustrated) associated with each comparison 102, whereby the player selects the appropriate input to pick a desired comparison 102. In other embodiments, separate one or more sets of mechanical reels (not illustrated but similar to mechanical form of the reels 34), wheels, dice or another suitable mechanical device display the generated amounts 102 and/or the comparison amounts 114, and the game provides separate simulated or electromechanical inputs (not illustrated) associated with each comparison 102, whereby the player selects the appropriate input to pick a desired comparison 102.

Figure 4A:
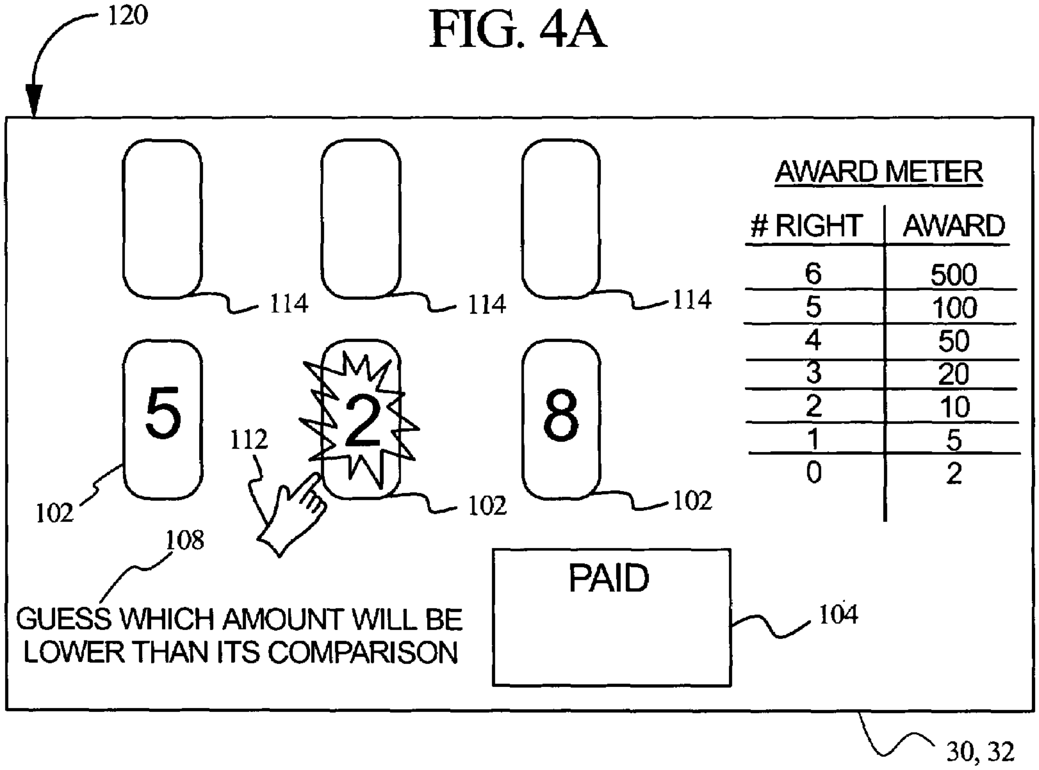
FIGS. 4A through 4H illustrate various embodiments of the present invention, wherein the game generates a set of comparison amounts with which to compare to a set of player selectable displayed amounts, and wherein the game employs an incrementing award meter.

Referring now to FIG. 4A, in this embodiment illustrated by the screen 120, the game generates a set of comparison amounts 114, so that each amount 102 has a corresponding comparison amount 114. The message 108, setting forth the procedure of the game, indicates that the game will generate a set of comparison amounts 114 (from the numerals zero through nine), and that the player should pick the amount that the player feels will be lower than its corresponding comparison amount.

In this embodiment, the game generates a first comparison amount 114 and compares it to the first displayed amount 102 of five. The game generates a second comparison amount 114 and compares it to the second displayed amount 102 of two. The game generates a third comparison amount 114 and compares it to the third displayed amount 102 of eight. The player picks the amount 102 that the player is most sure will be below the generated comparison amount 114. Another suitable instruction 108 would inform the player to pick the amount 102 for which the game will generate a higher comparison amount 114.

In this embodiment, like the last, picking the smallest amount 102 (here two) provides the best odds that the game will generate a higher value and that the player will win. Unlike the last embodiment in which the game only generates one comparison amount 114, the player might feel that the comparison amount 114 for the three amount 102 has a better chance at being higher than three than does the comparison amount 114 for the two amount 102. In one implementation, the game may be adapted to draw the comparison amounts 114 from one or more separate decks of cards for each amount 102, so that a player may determine that more "high" cards remain in the comparison amount deck(s) for the three amount 102 than in the comparison amount deck(s) for the two amount 102.

Figure 4B:
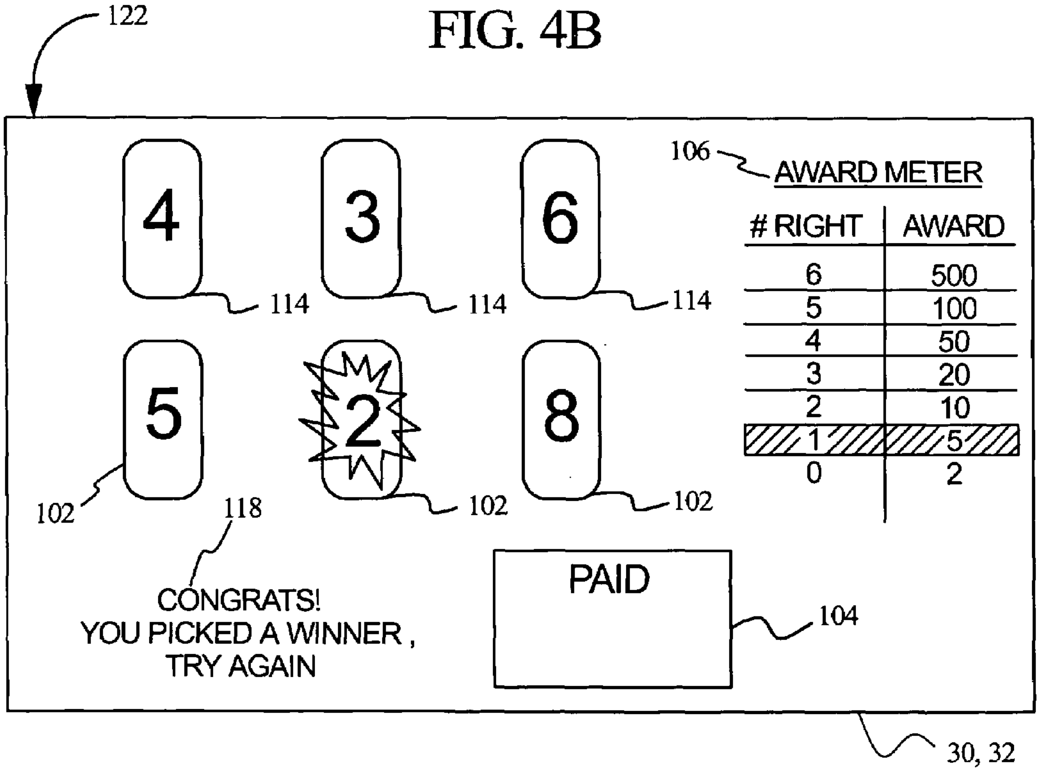

In the screen 120, the player 112 plays the best odds and picks the two amount 102, whereby the game generates the set of comparison amounts 114, four, three and six, as illustrated in the screen 122 of FIG. 4B. Since the player has picked the two amount 102, the game compares the corresponding three comparison amount 114. Because the player correctly picked an amount 102 that is lower than its corresponding comparison amount (note that other two choices in this example would have been losers), the game displays the outcome message 118 indicating that the player is a winner. The player's award for winning one time is five as is suitably indicated by the award meter 106.

Figure 4C:
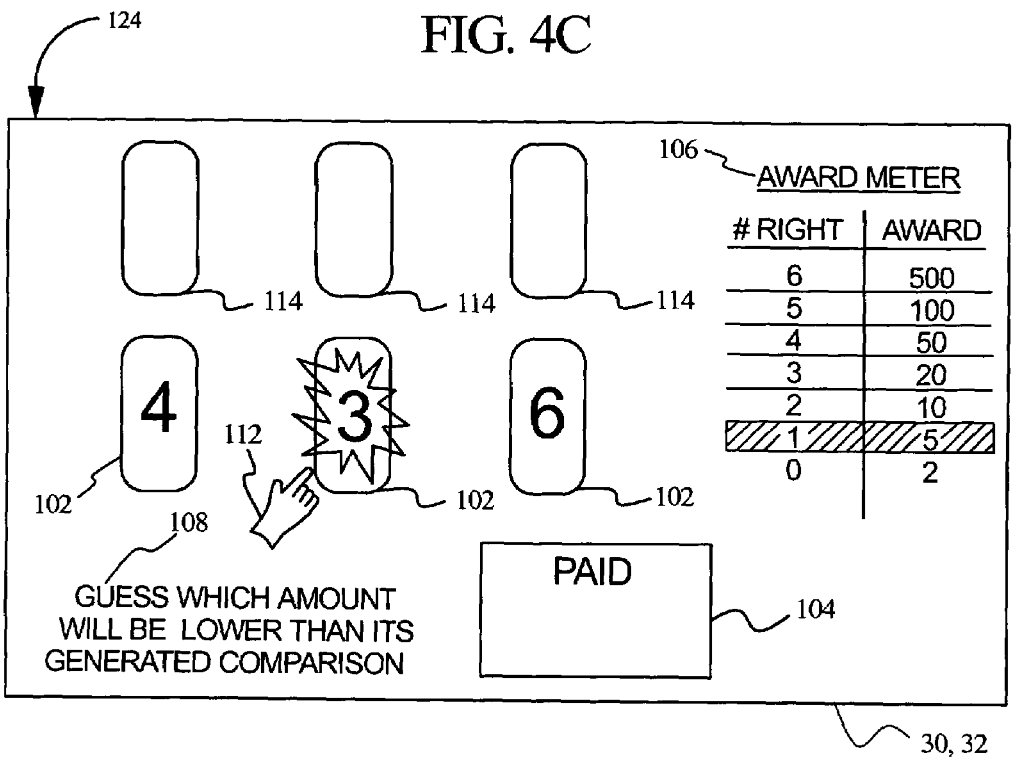

In connection with FIGS. 3A and 3B as indicated above, the game may be adapted to regenerate a new set of amounts 102 after the player's pick. The screen 124 of FIG. 4C illustrates a method for generating a new set of amounts 102, wherein the previously generated set of comparison amounts 114 becomes the new set for the amounts. As illustrated in the screen 124, the amounts 102 are now four, three and six. These were the comparison amounts 114 generated in the previous screen 122 of FIG. 4B.

The procedure message 108 in the screen 124 of FIG. 4C indicates that the player should pick the amount that the player feels will be lower than its corresponding comparison. In the screen 124, the player 112 plays the best odds and picks the three amount 102, whereby the game generates the set of comparison amounts 114, five, two and seven, as illustrated in the screen 126 of FIG. 4D. Since the player has picked the three amount 102, the game compares the corresponding two comparison amount 114. Because the player incorrectly picked an amount 102 that is higher than its corresponding comparison amount (note that in this example other two choices would have been winners), the game displays the outcome message 118 indicating that the player lost. The award meter 106 consequently does not increment.

Upon incorrectly picking an amount 102 in an embodiment employing the incrementing award meter, the game may be adapted to perform one of at least three procedures. One procedure includes ending the game and providing the award indicated by the award meter 106 to the player. The game downloads the amount to the player's credits and displays the amount on the paid display 104. This embodiment thus enables the player to keep incrementing the award meter 106 until the player loses a single time. As illustrated in one embodiment, the award meter 106 places a limit at six wins. The game in each of the endings preferably places a limit on the number of games the player may win. In this ending embodiment, a tie between the amount 102 and the comparison amount 114 may result in the game ending or a draw or push occurring.

In a second embodiment, the game provides the player with one of a number of strikes, such as three strikes, wherein the player gets to keep incrementing the award meter 106 until the player obtains the allotted number of strikes. The number of strikes may be predefined and constant or randomly determined at the start of the game. If randomly determined, a table stored in the memory device 40 may be weighted so that the game chooses at least one set of strikes, such as three strikes, more often than at least one other. In this embodiment, the game may be adapted to place a limit on the number of player selections, such as ten selections, in addition to or as a replacement for the award meter 106 limit on the number of wins. In this embodiment, the game may be adapted such that a tie results in a strike, the game ending or a draw occurring.

Figure 4D:
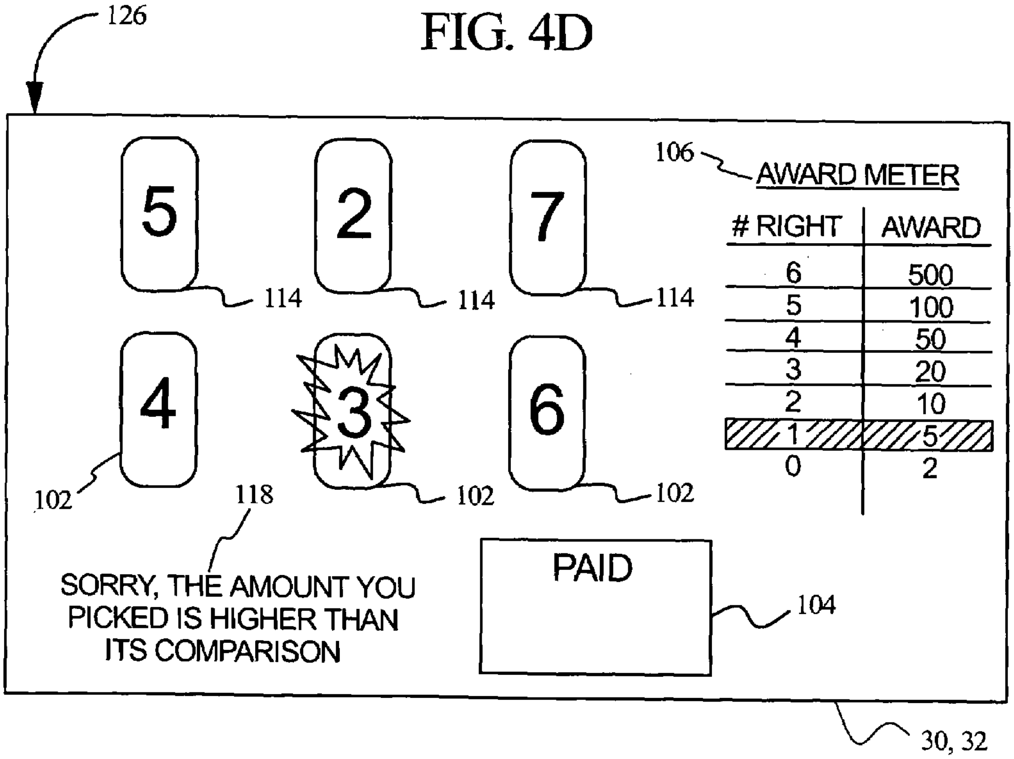
Figure 4E:
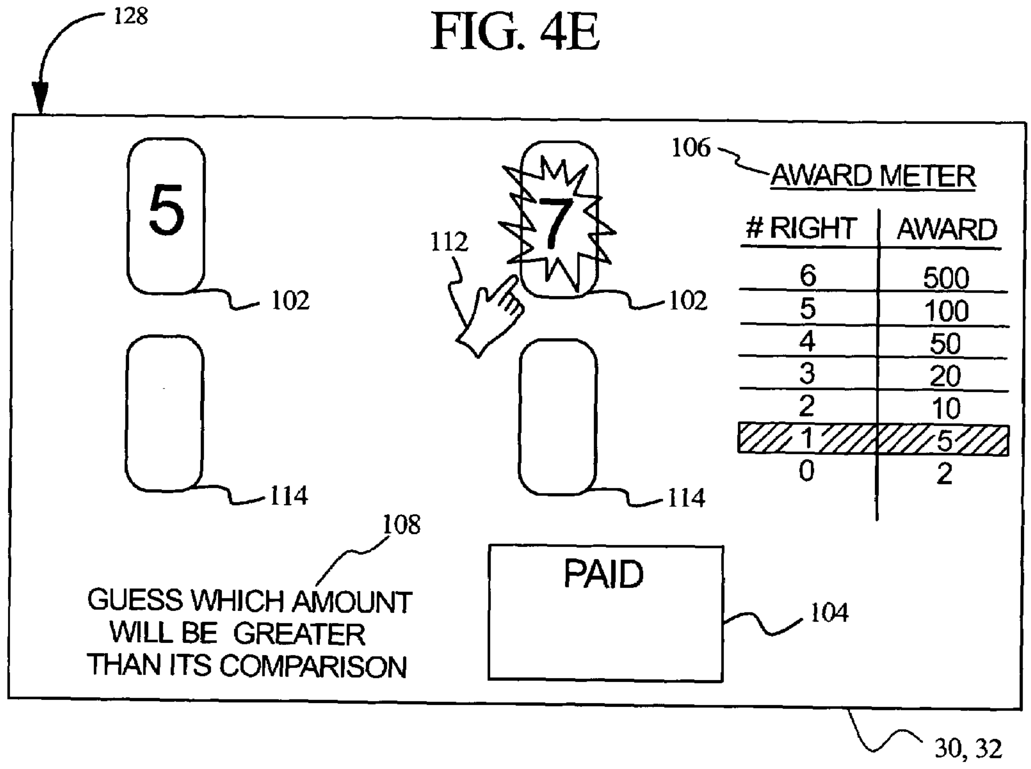

The screen 128 of FIG. 4E illustrates a third game ending embodiment, wherein the game removes the amount 102 selected in FIG. 4D and its respective comparison amount 114 from the screen. That is, the game reduces the set of amounts 102 and the set of comparison amounts 114 by one amount, for instance, by removing the player selected amount such as the middle amount on screen 126. In the illustrated embodiment, the screen 128 illustrates only two amounts 102. In addition, the game converts the remaining five and seven comparison amounts 114 into selectable amounts 102. In an alternative embodiment, in certain instances, the game may increase the number of selectable amounts 102.

In this third game ending embodiment, the game ends: (i) when a predefined number including all of the selectable amounts have been removed from the playing screen; or (ii) when the player makes a predefined number of selections or the player wins a predefined number of times (whichever first). In this game ending embodiment, the game may be adapted so that a tie results in the removal of the selected amount 102 (and corresponding comparison 114) or results in a draw.

The screen 128 of FIG. 4E illustrates that the game at any random or predefined time, may switch comparison types and ask, via the procedural message 108, the player to pick which amount 102 will be greater than a generated comparison amount. Another suitable instruction 108 would inform the player to pick the amount 102 for which the game will generate a lower comparison amount 114. The game may initially employ either comparison type and ask the player to pick a higher amount 102 as opposed to initially asking the player to pick a lower amount 102 as discussed above. In either case, the game may be adapted to alternate comparison types, switch every third player selection, every fourth selection, etc. The game may also be adapted to randomly pick a comparison type according to a non-weighted or weighted table stored in the memory device 40. It should also be appreciated that other comparisons instead of higher or lower may be employed. For instance, darker or lighter, smaller or bigger, or other suitable relationships may be employed. For purposes of this application, the words higher and lower are respectively defined to include such other types of comparisons.

Figure 4F:
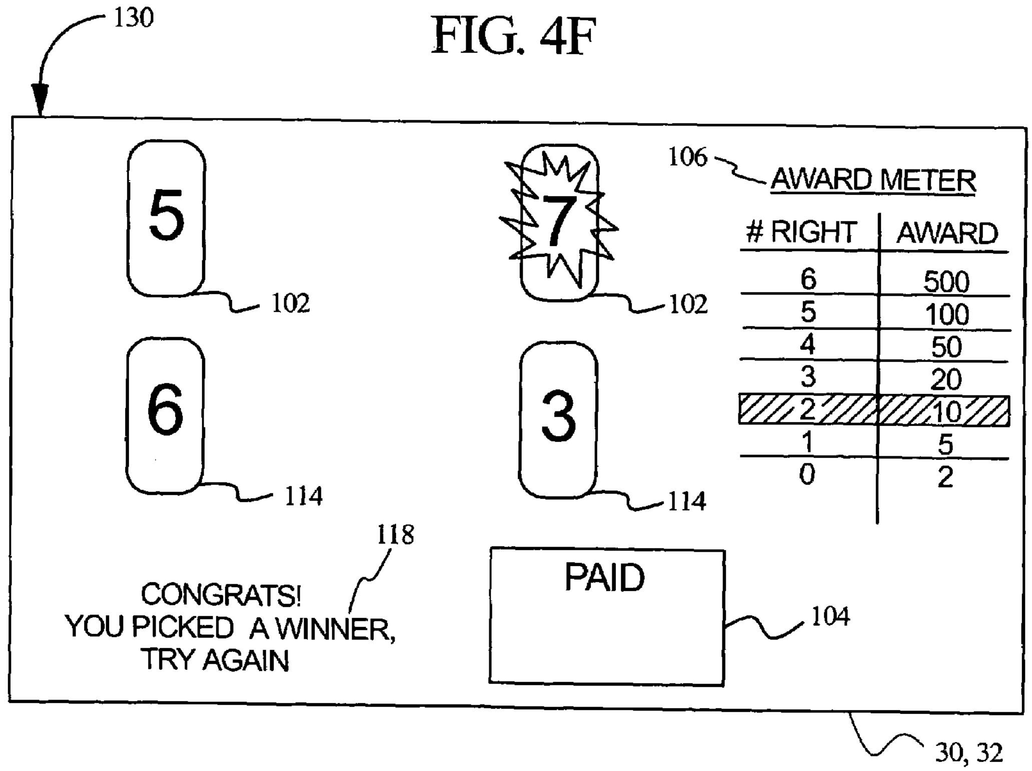

In the screen 128, the player 112 plays the best odds for picking an amount 102 that will be greater than a generated comparison amount and picks the seven amount 102. The game generates the set of comparison amounts 114, six and three as illustrated in the screen 130 of FIG. 4F. Since the player has picked the seven amount 102, the game compares the corresponding three comparison amount 114. Because the player correctly picked an amount 102 that is greater than its corresponding comparison amount (note the other choice in this example would have been a loss), the game displays the outcome message 118 indicating that the player is a winner. The player's award for winning two times is ten as is suitably indicated by the award meter 106.

Figure 4G:
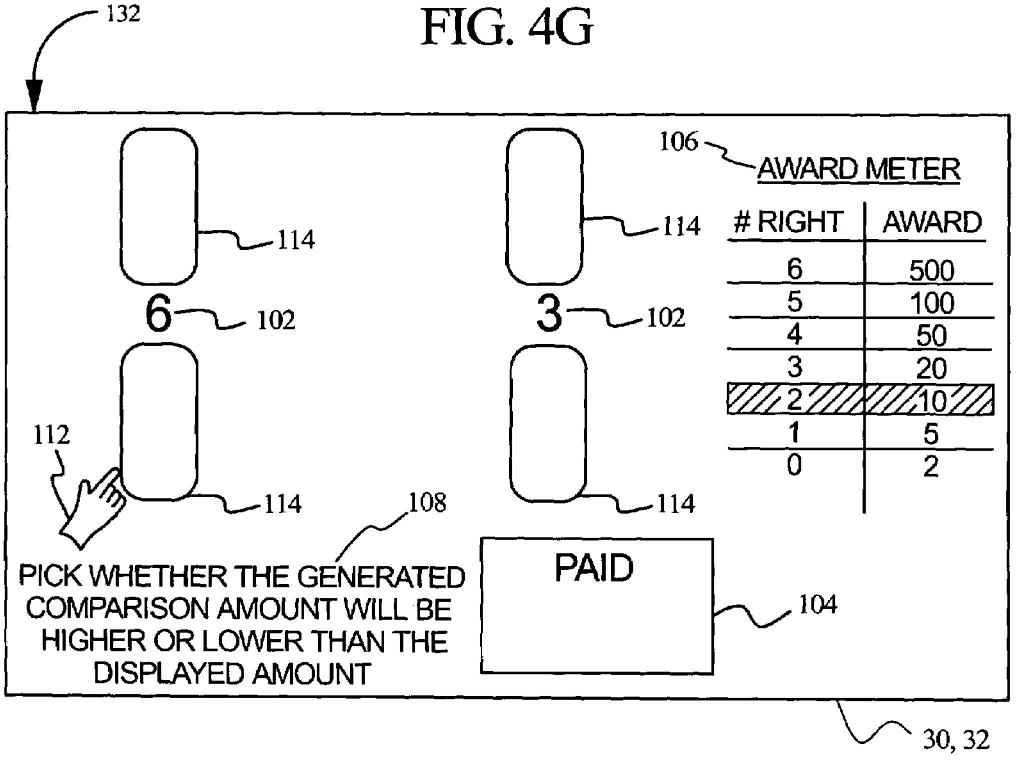

The screen 132 of FIG. 4G illustrates that the game at any random or predefined time, may switch comparison types and ask, via the procedural message 108, the player to pick, for any displayed amount 102, whether a generated comparison 114 will be higher or lower than the selected amount 102. In this embodiment, the player selects a higher area on a touch screen if the player thinks the comparison amount 114 will be higher. Likewise, the player selects a lower area on a touch screen if the player thinks the comparison amount 114 will be lower. Or, the player selects a higher or lower electromechanical input 114, for a desired amount 102 in the alternative embodiment, where the amounts 102 are preferably generated on mechanical reels.

The game may initially ask the player to pick a higher or lower comparison amount 114 as opposed to initially asking the player to pick a lower amount 102 or a higher amount 102 as discussed above. In any case, the game may be adapted to alternate between any two or three comparison types, switch every third player selection, every fourth selection, etc. The game may also be adapted to randomly pick a comparison type according to a non-weighted or weighted table stored in the memory device 40.

Figure 4H:
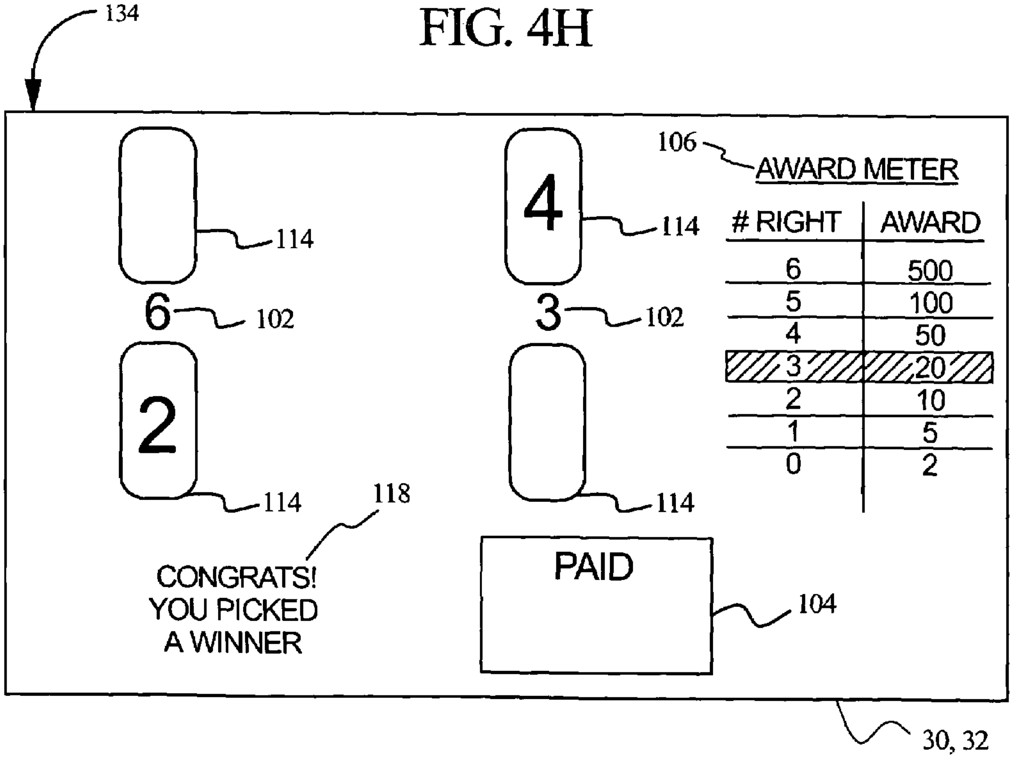

In the screen 132, the player 112 has equal odds of picking a generated comparison amount 114 for the six amount 102 that will be less than six (i.e., 0-5) of FIG. 4G as the player has for picking a generated comparison amount 114 for the three amount 102 will be greater than three (4-9). The player 112 bets that the comparison amount 114 will be less than six, as illustrated. The game generates the set of comparison amounts 114, two and four as illustrated in the screen 134 of FIG. 4H. Since the player has played the displayed six amount 102, the game compares the corresponding comparison amount 114 of two. Because the player correctly picked that the comparison amount 114 is less than six, the game displays the outcome message 118 indicating that the player is a winner. The player's award for winning three times is twenty as indicated by the award meter 106 in FIG. 4H.

In one alternative embodiment, the selections or amounts 102 are weighted such that a selection or amount with a lower probability of success (such as 8) has a higher payout or move up the award meter than a selection or amount with a higher probability of success (such as 2) which has a lower payout or move up the award meter. Each selection could have a different range of possible payouts or different paytable.

Figure 5A:
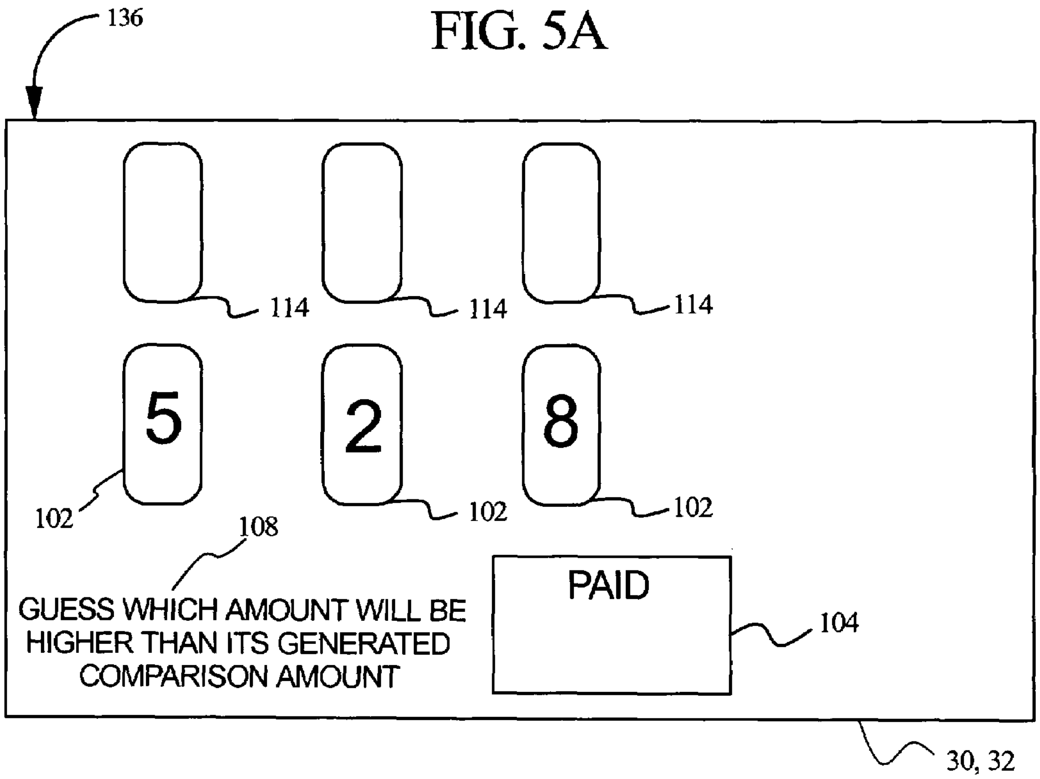
FIGS. 5A and 5B illustrate various embodiments of the present invention, wherein the game generates a set of comparison amounts with which to compare to a set of player selectable displayed amounts, and wherein the game awards the player with a combination of the amounts or the comparison amounts.
Figure 5B:
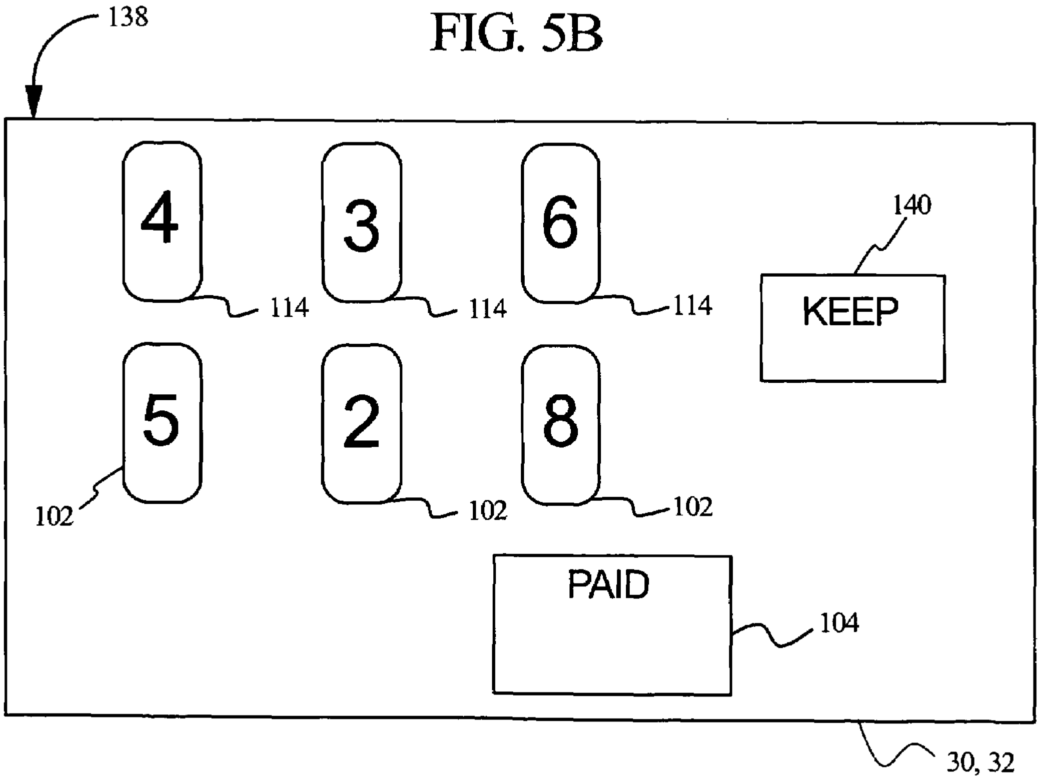

Referring now to FIGS. 5A and 5B, in other embodiments, the game may award the player based on the set of displayed amounts 102 or the set of comparison amounts 114. In one embodiment illustrated in the screen 136 of FIG. 5A, the game invokes the player to guess which generated comparison amount 114 will be higher than the displayed amount 102, as indicated by the procedural message 108. In this embodiment, the player is initially provided an award of 528 (or some mathematical combination thereof), and the player attempts to upgrade the award by replacing a digit with a higher number. If the game instead generates a lower number, the game replaces the digit of the award with the lower number and the award or combination decreases accordingly.

The game may be adapted to provide a number of disincentives for the player not to attempt to upgrade the displayed award. Assuming the award is the placement of the displayed amounts, such as 528, one disincentive occurs when the game provides a limit to the number of times that the player can attempt to upgrade a digit. For instance, in the screen 136 of FIG. 5A, if the game provides three tries and the player is contemplating making the last try, the player must weigh the risk against the award. If the player selects the eight amount 102, the player is likely to be incorrect, because the game will likely generate a zero to seven amount. However the player is only risking a total of eight credits. If the player selects the two amount 102, the player could lose up to twenty credits but could gain up to seventy credits. If the player selects the five amount 102, the player could lose up to five hundred credits but could gain up to four hundred credits.

The game may be adapted to remove a digit if the player incorrectly picks whether a generated comparison amount is higher or lower than a displayed amount 102, as described in connection with FIGS. 4D and 4E. In one implementation, the player must select amounts 102 until the player loses a number of times and the game removes a predefined number of amounts from the award.

In another embodiment illustrated in the screen 138 of FIG. 5B, the game provides a keep input 140. The game enables the player to upgrade the award as described above or keep the award displayed by the amounts 102 at any time by selecting the keep input 140. In an embodiment wherein the game removes a digit if the player incorrectly picks whether a generated comparison amount is higher or lower than a displayed amount 102, the player must weigh the benefit of upgrading the award against losing an order of magnitude, i.e., one's, ten's or hundred's digit, from the award.

In the embodiments described in connection with the screens 136 and 138, the game may be adapted to provide an award that includes or combines the comparison amounts 114 rather than the amounts 102. That is, in the previous embodiments described in connection with the screens 136 and 138, the game replaces the amount 102 or digit that the player selects. Here, however, the game generates a set of comparison amounts 114, and if the player incorrectly selects higher or lower, the game provides an award that is a combination of the comparison amounts 114. In this embodiment, the player must consider that each digit or amount of the award could change. This consideration becomes especially crucial: (i) on the player's last try; (ii) whenever the player has a keep option; and (iii) on any try which may result in the termination of the game.

It should be appreciated that while the invention is primarily described as a high-low game, where the player guesses higher or lower comparisons, other embodiments can be employed in accordance with the present invention which employ the same or similar concepts and the use of higher and lower herein are meant to include such concepts.

While the present invention is described in connection with what is presently considered to be the most practical and embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A gaming device operated under the control of a processor, said gaming device comprising:

a game operable upon a wager by a player and controlled by the processor;

a plurality of amounts including a plurality of different amounts;

a display device; and an input device, wherein the processor is operable with the display device and the input device to:

(a) generate a set of at least two of said different amounts and display the set of the at least two of said different amounts to the player;

(b) enable the player to input a selection any one of said at least two displayed amounts that the player thinks will be lower than a generated comparison amount from said plurality of amounts;

(c) generate and display said comparison amount; and (d) provide an award to the player if the player selected amount is lower than the generated comparison amount.

2. The gaming device of claim 1, wherein the processor is operable to remove the player selected amount from the set of amounts if the selected amount is higher than the generated comparison amount.

3. The gaming device of claim 2, wherein the processor and the input device are operable to enable the player to input a selection of any one of the amounts from the amounts remaining in the set that the player thinks will be lower than a second generated comparison amount from the plurality of amounts.

4. The gaming device of claim 2, wherein the processor and the input device are operable to enable the player to input a selection of any one of the amounts from the amounts remaining in the set that the player thinks will be higher than a second generated comparison amount from the plurality of amounts.

5. The gaming device of claim 2, wherein the processor is operable to repeat (b) through (d) until a predefined number of amounts have been removed from the set of amounts.

6. The gaming device of claim 5, wherein the processor is operable to generate a set of at least two comparison amounts from the plurality of amounts, one of which is the generated comparison amount compared to the selected amount.

7. The gaming device of claim 2, wherein the processor is operable to replace the removed amount of the set of amounts with the comparison amount before repeating (b).

8. The gaming device of claim 1, wherein the processor is operable to repeat (b) through (d) until the player selected amounts are not correct a predefined number of times.

9. The gaming device of claim 8, wherein the processor is operable to generate a set of at least two comparison amounts from the plurality of amounts, one of which is the generated amount compared to the selected amount.

10. The gaming device of claim 9, wherein the processor is operable to replace each of the amounts in the set of amounts with each of the comparison amounts in the comparison set before repeating (b).

11. The gaming device of claim 1, wherein the award is generated by the processor.

12. The gaming device of claim 1, wherein the amounts in the set of amounts are randomly generated by the processor.

13. The gaming device of claim 12, wherein the comparison amount is randomly generated by the processor.

14. The gaming device of claim 1, wherein the comparison amount is randomly generated by the processor.

15. A gaming device operated under the control of a processor, said gaming device comprising:

a game operable upon a wager by a player and controlled by the processor;

a plurality of amounts including a plurality of different amounts;

a display device; and an input device, wherein the processor is operable with the display device and input device to:

(a) generate a set of at least two of said different amounts and display the set of the at least two of said different amounts to the player;

(b) enable the player to input a selection of any one of said at least two displayed amounts that the player thinks will be lower than a generated comparison amount from said plurality of amounts;

(c) generate and display said comparison amount;

(d) if the selected amount is lower than the generated comparison amount, repeat (b) to (c) at least once wherein said generated comparison amount replaces the amount of the set previously selected by the player; and (e) provide an award to the player based on how many player selected amounts are lower than the respective generated comparison amounts.

16. A gaming device operated under the control of a processor, said gaming device comprising:

a game operable upon a wager by a player and controlled by the processor;

a plurality of amounts including a plurality of different amounts;

a display device; and an input device, wherein the processor is operable with the display device and input device to:

(a) generate a set of at least two of said different amounts and display the set of the at least two of said different amounts to the player;

(b) enable the player to input a selection of any one of said at least two displayed amounts that the player thinks will be lower than one of a plurality of generated comparison amounts from said plurality of amounts;

(c) generate said plurality of comparison amounts;

(d) cause a selection of and display one of the comparison amounts; and (e) provide an award to the player if the player selected amount is lower than the selected comparison amount.

17. A gaming device operated under the control of a processor, said gaming device comprising:

a game operable upon a wager by a player and controlled by the processor;

a plurality of amounts including a plurality of different amounts;

an award meter controlled by the processor;

a display device; and an input device, wherein the processor is operable with the display device and input device to:

(a) generate a set of at least two of said different amounts and display the set of the at least two of said different amounts to the player;

(b) enable the player to input a selection of any one of said at least two displayed amounts that the player thinks will be lower than a generated comparison amount from said plurality of amounts;

(c) generate and display said comparison amount;

(d) increment the award meter if the player selected amount is lower than the generated comparison amount;

(e) repeat (a) to (d) at least once; and (f) provide the award indicated by the award meter to the player.

* * * * *